United States Patent
Demos

(10) Patent No.: US 6,816,552 B2
(45) Date of Patent: Nov. 9, 2004

(54) INTERPOLATION OF VIDEO COMPRESSION FRAMES

(75) Inventor: Gary A. Demos, Culver City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 722 days.

(21) Appl. No.: 09/904,203

(22) Filed: Jul. 11, 2001

(65) Prior Publication Data
US 2003/0112871 A1 Jun. 19, 2003

(51) Int. Cl.[7] .................................................. H04N 7/12
(52) U.S. Cl. ................ 375/240.15; 382/239; 348/409.1
(58) Field of Search ....................... 375/240.12, 240.15, 375/240.17, 240.24, 240.16; 348/409.1, 396.1; 382/238, 239

(56) References Cited

U.S. PATENT DOCUMENTS

| | | | |
|---|---|---|---|
| 5,442,407 A | 8/1995 | Iu | |
| 5,475,435 A | 12/1995 | Yonemitsu et al. | |
| 5,825,421 A | 10/1998 | Tan | |
| 5,825,680 A * | 10/1998 | Wheeler et al. | 708/650 |
| 5,988,863 A * | 11/1999 | Demos | 708/203 |
| 6,172,768 B1 * | 1/2001 | Yamada et al. | 358/1.9 |
| 6,215,824 B1 | 4/2001 | Assuncao | |
| 6,629,104 B1 * | 9/2003 | Parulski et al. | 707/102 |
| 6,728,317 B1 * | 4/2004 | Demos | 375/240.21 |

\* cited by examiner

*Primary Examiner*—Gims Philippe
(74) *Attorney, Agent, or Firm*—Fish & Richardson P.C.

(57) ABSTRACT

A method, system, and computer programs for improving the image quality of one or more bi-directionally predicted intermediate frames in a video image compression system, where each frame comprises a plurality of pixels. In one aspect, the invention includes determining the value of each pixel of each bi-directionally predicted intermediate frame as a weighted proportion of corresponding pixel values in non-bidirectionally predicted frames bracketing the sequence of bi-directionally predicted intermediate frames. In one embodiment, the weighted proportion is a function of the distance between the bracketing non-bidirectionally predicted frames. In another embodiment, the weighted proportion is a blended function of the distance between the bracketing non-bidirectionally predicted frames and an equal average of the bracketing non-bidirectionally predicted frames. In another aspect of the invention, interpolation of pixel values is performed on representations in a linear space, or in other optimized non-linear spaces differing from an original non-linear representation.

42 Claims, 3 Drawing Sheets

Blended Pixel Value Weighting

Proportional Motion Vector Weighting
(Prior Art)**

Pixel Value Proportional Weighting

Blended Pixel Value Weighting

INTERPOLATION OF VIDEO COMPRESSION FRAMES

TECHNICAL FIELD

This invention relates to video compression, and more particularly to improved interpolation of video compression frames in MPEG-like encoding and decoding systems.

BACKGROUND

MPEG Background

MPEG-2 and MPEG-4 are international video compression standards defining a video syntax that provides an efficient way to represent image sequences in the form of more compact coded data. The language of the coded bits is the "syntax." For example, a few tokens can represent an entire block of samples (e.g., 64 samples for MPEG-2). Both MPEG standards also describe a decoding (reconstruction) process where the coded bits are mapped from the compact representation into an approximation of the original format of the image sequence. For example, a flag in the coded bitstream signals whether the following bits are to be preceded with a prediction algorithm prior to being decoded with a discrete cosine transform (DCT) algorithm. The algorithms comprising the decoding process are regulated by the semantics defined by these MPEG standards. This syntax can be applied to exploit common video characteristics such as spatial redundancy, temporal redundancy, uniform motion, spatial masking, etc. In effect, these MPEG standards define a programming language as well as a data format. An MPEG decoder must be able to parse and decode an incoming data stream, but so long as the data stream complies with the corresponding MPEG syntax, a wide variety of possible data structures and compression techniques can be used (although technically this deviates from the standard since the semantics are not conformant). It is also possible to carry the needed semantics within an alternative syntax.

These MPEG standards use a variety of compression methods, including intraframe and interframe methods. In most video scenes, the background remains relatively stable while action takes place in the foreground. The background may move, but a great deal of the scene is redundant. These MPEG standards start compression by creating a reference frame called an "intra" frame or "I frame". I frames are compressed without reference to other frames and thus contain an entire frame of video information. I frames provide entry points into a data bitstream for random access, but can only be moderately compressed. Typically, the data representing I frames is placed in the bitstream every 12 to 15 frames (although it is also useful in some circumstances to use much wider spacing between I frames). Thereafter, since only a small portion of the frames that fall between the reference I frames are different from the bracketing I frames, only the image differences are captured, compressed, and stored. Two types of frames are used for such differences—predicted or P frames, and bi-directional Interpolated or B frames.

P frames generally are encoded with reference to a past frame (either an I frame or a previous P frame), and, in general, are used as a reference for subsequent P frames. P frames receive a fairly high amount of compression. B frames provide the highest amount of compression but require both a past and a future reference frame in order to be encoded. Bi-directional frames are never used for reference frames in standard compression technologies.

Macroblocks are regions of image pixels. For MPEG-2, a macroblock is a 16×16 pixel grouping of four 8×8 DCT blocks, together with one motion vector for P frames, and one or two motion vectors for B frames. Macroblocks within P frames may be individually encoded using either intra-frame or inter-frame (predicted) coding. Macroblocks within B frames may be individually encoded using intra-frame coding, forward predicted coding, backward predicted coding, or both forward and backward (i.e., bi-directionally interpolated) predicted coding. A slightly different but similar structure is used in MPEG-4 video coding.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed pattern (e.g., IBBPBBPBBPBBPBB).

Motion Vector Prediction

In MPEG-2 and MPEG-4 (and similar standards, such as H.263), use of B-type (bi-directionally predicted) frames have proven to benefit compression efficiency. Motion vectors for each macroblock can be predicted by any one of the following three methods:

1) Predicted forward from the previous I or P frame (i.e., a non-bidirectionally predicted frame).
2) Predicted backward from the subsequent I or P frame.
3) Bi-directionally predicted from both the subsequent and previous I or P frame.

Mode 1 is identical to the forward prediction method used for P frames. Mode 2 is the same concept, except working backward from a subsequent frame. Mode 3 is an interpolative mode that combines information from both previous and subsequent frames.

In addition to these three modes, MPEG-4 also supports a second interpolative motion vector prediction mode: direct mode prediction using the motion vector from the subsequent P frame, plus a delta value. The subsequent P frame's motion vector points at the previous P or I frame. A proportion is used to weight the motion vector from the subsequent P frame. The proportion is the relative time position of the current B frame with respect to the subsequent P and previous P (or I) frames.

FIG. 1 is a time line of frames and MPEG-4 direct mode motion vectors in accordance with the prior art. The concept of MPEG-4 direct mode (mode 4) is that the motion of a macroblock in each intervening B frame is likely to be near the motion that was used to code the same location in the following P frame. A delta is used to make minor corrections to this proportional motion vector derived from the subsequent P frame. Shown is the proprotional weighting given to motion vectors (MV) 101, 102, 103 for each intermediate B frame 104a, 104b as a function of "distance" between the previous P or I frame 105 and the next P frame 106. The motion vector assigned to each intermediate B frame 104a, 104b is equal to the assigned weighting value times the motion vector for the next P frame, plus the delta value.

With MPEG-2, all prediction modes for B frames are tested in coding, and are compared to find the best prediction for each macroblock. If the prediction is not good, then the macroblock is coded stand-alone as an "I" (for "intra") macroblock. The coding mode is selected as the best mode between forward (mode 1), backward (mode 2), and bi-directional (mode 3), or as intra. With MPEG-4, the intra choice is not allowed. Instead, direct mode becomes the fourth choice. Again, the best coding mode is chosen, based upon some best-match criteria. In the reference MPEG-2 and MPEG-4 software encoders, the best match is determined using a DC match (Sum of Absolute Difference, or "SAD").

The number of successive B frames is determined by the "M" parameter value in MPEG. M minus one is the number of B frames between each P frame and the next P (or I). Thus, for M=3, there are two B frames between each P (or I) frame, as illustrated in FIG. 1. The main limitation in restricting the value of M, and therefore the number of sequential B frames, is that the amount of motion change between P (or I) frames becomes large. Higher numbers of B frames mean longer amounts of time between P (or I) frames. Thus, the efficiency and coding range limitations of motion vectors create the ultimate limit on the number of intermediate B frames.

It is also significant to note that P frames carry "change energy" forward with the moving picture stream, since each decoded P frame is used as the starting point to predict the next subsequent P frame. B frames, however, are discarded after use. Thus, any bits used to create B frames are used only for that frame, and do not provide corrections that aid subsequent frames, unlike P frames.

SUMMARY

The invention is directed to a method, system, and computer programs for improving the image quality of one or more bi-directionally predicted intermediate frames in a video image compression system, where each frame comprises a plurality of pixels.

In one aspect, the invention includes determining the value of each pixel of each bi-directionally predicted intermediate frame as a weighted proportion of corresponding pixel values in non-bidirectionally predicted frames bracketing the sequence of bi-directionally predicted intermediate frames. In one embodiment, the weighted proportion is a function of the distance between the bracketing non-bidirectionally predicted frames. In another embodiment, the weighted proportion is a blended function of the distance between the bracketing non-bidirectionally predicted frames and an equal average of the bracketing non-bidirectionally predicted frames.

In another aspect of the invention, interpolation of pixel values is performed on representations in a linear space, or in other optimized non-linear spaces differing from an original non-linear representation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Overview

One aspect of the invention is based upon recognition that it is common practice to use a value for M of 3, which provides for two B frames between each P (or I) frame. However M=2, and M=4 or higher, are all useful. It is of particular significance to note that the value of M (the number of B frames plus 1) also bears a natural relationship to the frame rate. At 24 frames per second (fps), the rate of film movies, the $\frac{1}{24}$th second time distance between frames can results in substantial changes frame-to-frame. At 60 fps, 72 fps, or higher frame rates, however, the time distance between adjacent frames becomes correspondingly reduced. The result is that higher numbers of B frames (i.e., higher values of M) become useful and beneficial in compression efficiency as the frame rate is increased.

Another aspect of the invention is based upon the recognition that both MPEG-2 and MPEG-4 video compression utilize an oversimplified method of interpolation. For example, for mode 3, the bi-directional prediction for each macroblock of a frame is an equal average of the subsequent and previous frame macroblocks, as displaced by the two corresponding motion vectors. This equal average is appropriate for M=2 (i.e., single intermediate B frames), since the B frame will be equidistant in time from the previous and subsequent P (or I) frames. However, for all higher values of M, only symmetrically centered B frames (i.e., the middle frame if M=4, 6, 8, etc.) will be optimal using an equal weighting. Similarly, in MPEG-4 direct mode 4, even though the motion vectors are proportionally weighted, the predicted pixel values for each intermediate B frame are an equal proportion of the previous P (or I) and subsequent P frame.

Thus, it represents an improvement to apply an appropriate proportional weighting, for M>2, to the predicted pixel values for each B frame. The proportional weighting for each pixel in a current B frame corresponds to the relative position of the current B frame with respect to the previous and subsequent P (or I) frames. Thus, if M=3, the first B frame would use $\frac{2}{3}$ of the corresponding pixel value (motion vector adjusted) from the previous frame, and $\frac{1}{3}$ of the corresponding pixel value from the subsequent frame (motion vector adjusted).

Figure 1:
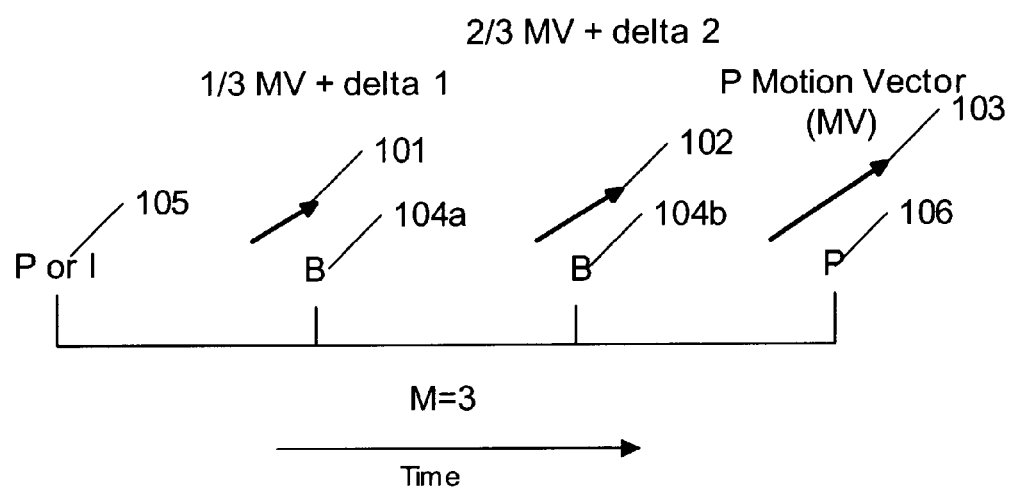
FIG. 1 is a time line of frames and MPEG-4 direct mode motion vectors in accordance with the prior art.
Figure 2:
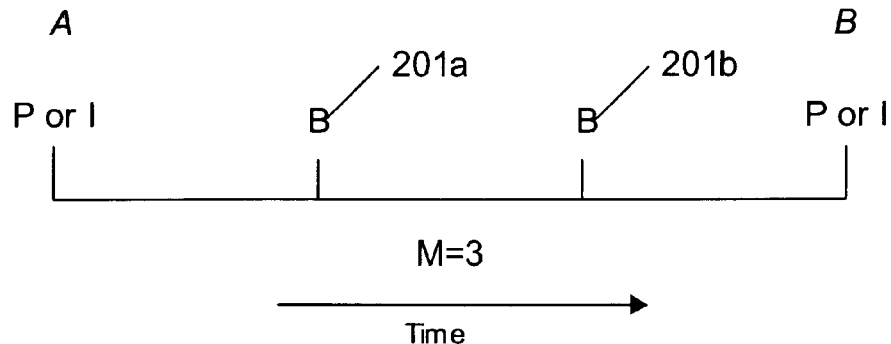
FIG. 2 is a time line of frames and proportional pixel weighting values in accordance with a first aspect of the invention.

FIG. 2 is a time line of frames and proportional pixel weighting values in accordance with this aspect of the invention. The pixel values within each macroblock of each intermediate B frame 201a, 201b are weighted as a function of "distance" between the previous P or I frame A and the next P or I frame B. That is, each pixel value of a bi-directionally predicted B frame is a weighted combination of the corresponding pixel values of bracketing non-bidirectionally predicted frames A and B. In this example, for M=3, the weighting for the first B frame 201a is equal to $\frac{2}{3}A+\frac{1}{3}B$; the weighting for the second B frame 201b is equal to $\frac{1}{3}A+\frac{2}{3}B$. Also shown is the equal average weighting that would be assigned under conventional MPEG systems; the MPEG-1, 2, and 4 weighting for each B frame 201a, 201b is equal to (A+B)/2.

Application to Extended Dynamic Range and Contrast Range

If M is greater than 2, proportional weighting of pixel values in intermediate B frames will improve the effectiveness of bi-directional (mode 3) and direct (MPEG-4 mode 4) coding in many cases. Example cases include common movie and video editing effects such as fade-outs and cross-dissolves. These types of video effects are problem coding cases for both MPEG-2 and MPEG-4 due to use of a simple DC match, and the common use of M=3 (i.e., two intermediate B frames), resulting in equal proportions for B frames. Coding of such cases is improved by using proportional B frame interpolation.

Proportional B frame interpolation also has direct application to coding efficiency improvement for extending dynamic and contrast range. A common occurrence in image coding is a change in illumination. This occurs when an object moves gradually into (or out from) shadow (soft shadow edges). If a logarithmic coding representation is used for brightness (as embodied by logarithmic luminance Y, for example), then a lighting brightness change will be a DC offset change. If the brightness of the lighting drops to half, the pixel values will all be decreased by an equal amount. Thus, to code this change, an AC match should be found, and a coded DC difference applied to the region. Such a DC difference being coded into a P frame should be proportionally applied in each intervening B frame as well. (See co-pending U.S. pat. application Ser. No. 09/905,039, entitled "Method and System for Improving Compressed Image Chroma Information", filed concurrently herewith, assigned to the assignee of the present invention, and hereby incorporated by reference, for additional information on logarithmic coding representations).

In addition to changes in illumination, changes in contrast also benefit from proportional B frame interpolation. For example, as an airplane moves toward a viewer out of a cloud or haze, its contrast will gradually increase. This contrast increase will be expressed as an increased amplitude in the AC coefficients of the DCT in the P frame coded macroblocks. Again, contrast changes in intervening B frames will be most closely approximated by a proportional interpolation, thus improving coding efficiency.

Improvements in dynamic range and contrast coding efficiency using proportional B frame interpolation become increasingly significant as frame rates become higher and as the value of M is increased.

Applying High M Values to Temporal Layering

Using embodiments of the invention to increase the value of M, and hence the number of B frames between bracketing P and/or I frames, while maintaining or gaining coding efficiency provides a number of applications, including temporal layering. For example, in U.S. Pat. No. 5,988,863, entitled "Temporal and Resolution Layering for Advanced Television" (assigned to the assignee of the present invention, and incorporated by reference), it was noted that B frames are a suitable mechanism for layered temporal (frame) rates. The flexibility of such rates is related to the number of B frames available. For example, single B frames (M=2) can support a 36 fps decoded temporal layer within a 72 fps stream or a 30 fps decoded temporal layer within a 60 fps stream. Triple B frames (M=4) can support both 36 fps and 18 fps decoded temporal layers within a 72 fps stream, and 30 fps and 15 fps decoded temporal layers within a 60 fps stream. Using M=10 within a 120 fps stream can support 12 fps, 24 fps, and 60 fps decoded temporal layers. M=4 can be used with a 144 fps stream to provide for decoded temporal layers at 72 fps and 36 fps.

As an improvement to taking every $N^{th}$ frame, multiple frames at 120 fps or 72 fps can be decoded and proportionally blended, as described in co-pending U.S. patent application Ser. No. 09/545,233, entitled "Enhancements to Temporal and Resolution Layering" (assigned to the assignee of the present invention, and incorporated by reference), to improve the motion blur characteristics of the 24 fps results.

Even higher frame rates can be synthesized utilizing the methods described in co-pending U.S. patent application Ser. No. 09/435,277, entitled "System and Method for Motion Compensation and Frame Rate Conversion" (assigned to the assignee of the present invention, and incorporated by reference). For example, a 72 fps camera original can be utilized with motion compensated frame rate conversion to create an effective frame rate of 288 frames per second. Using M=12, both 48 fps and 24 fps frame rates can be derived, as well as other useful rates such as 144 fps, 96 fps, and 32 fps (and of course, the original 72 fps). The frame rate conversions using this method need not be integral multiples. For example, an effective rate of 120 fps can be created from a 72 fps source, and then used as a source for both 60 fps and 24 fps rates (using M=10).

Thus, there are temporal layering benefits to optimizing the performance of B frame interpolation. The proportional B frame interpolation described above make higher numbers of B frames function more efficiently, thereby enabling these benefits.

Blended B-Frame Interpolation Proportions

One reason that equal average weighting has been used in conventional systems as the motion compensated mode predictor for B frame pixel values is that the P (or I) frame before or after a particular B frame may be noisy, and therefore represent an imperfect match. Equal blending will optimize the reduction of noise in the interpolated motion-compensated block. There is a difference residual that is coded using the quantized DCT function. Of course, the better the match from the motion compensated proportion, the fewer difference residual bits will be required, and the higher the resulting image quality.

In cases where there are objects moving in and out of shadow or haze, a true proportion where m>2 provides a better prediction. However, when lighting and contrast changes are not occurring, equal weighting may prove to be a better predictor, since the errors of moving a macroblock forward along a motion vector will be averaged with the errors from the backward displaced block, thus reducing the errors in each by half. Even so, it is more likely that B frame macroblocks nearer a P (or I) frame will correlate more to that frame than to a more distant P (or I) frame.

Thus, it is desirable in some circumstances, such as regional contrast or brightness change, to utilize a true proportion for B frame macroblock pixel weighting (for both luminance and color). In other circumstances, it may be more optimal to utilize equal proportions, as in MPEG-2 and MPEG-4.

A blend can also be made of these two proportion techniques (equal average versus frame-distance proportion). For example, in the M=3 case, ¾ of the ⅓ and ⅔ proportions can be blended with ¼ of the equal average, resulting in the two proportions being ⅜ and ⅝. This technique may be generalized by using a "blend factor" F:

$$\text{Weight}=F \cdot (\text{FrameDistanceProportionalWeight})+(1-F) \cdot (\text{EqualAverageWeight})$$

The useful range of the blend factor F is from 1, indicating purely proportional interpolation, to 0, indicating purely equal average (the reverse assignment of values may also be used).

Figure 3:
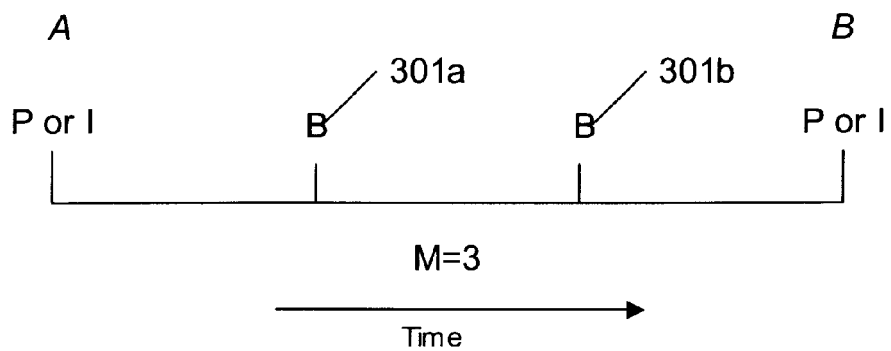
FIG. 3 is a time line of frames and blended proportional and equal pixel weighting values in accordance with a second aspect of the invention.

FIG. 3 is a time line of frames and blended proportional and equal pixel weighting values in accordance with this aspect of the invention. The pixel values of each macroblock of each intermediate B frame 301a, 301b are weighted as a function of "time distance" between the previous P or I frame A and the next P or I frame B, and as a function of the equal average of A and B. In this example, for M=3 and a blend factor F=¾, the blended weighting for the first B frame 301a is equal to ⅝A+⅜B (i.e., ¾ of the proportional weighting of ⅔A+⅓B, plus ¼ of the equal average weighting of (A+B)/2). Similarly, the weighting for the second B frame 301b is equal to ⅜A+⅝B.

The value of the blend factor can be set overall for a complete encoding, or for each group of pictures (GOP), a range of B frames, each B frame, or each region within a B frame (including, for example, as finely as for each macroblock or, in the case of MPEG-4 direct mode using a P vector in 8×8 mode, even individual 8×8 motion blocks).

In the interest of bit economy, and reflecting the fact that the blend proportion is not usually important enough to be conveyed with each macroblock, optimal use of blending should be related to the type of images being compressed. For example, for images that are fading, dissolving, or where overall lighting or contrast is gradually changing, a blend factor F near or at 1 (i.e., selecting proportional interpolation) is generally most optimal. For running images without such lighting or contrast changes, then lower blend factor values, such as $2/3$, $1/2$, or $1/3$, might form a best choice, thereby preserving some of the benefits of proportional interpolation as well as some of the benefits of equal average interpolation. All blend factor values within the 0 to 1 range generally will be useful, with one particular value within this range proving optimal for any given B frame.

For wide dynamic range and wide contrast range images, the blend factor can be determined regionally, depending upon the local region characteristics. In general, however, a wide range of light and contrast recommends toward blend factor values favoring purely proportional, rather than equal average, interpolation.

An optimal blend factor is generally empirically determined, although experience with particular types of scenes can be used to create a table of blend factors by scene type. For example, a determination of image change characteristics can be used to select the blend proportion for a frame or region. Alternatively, B frames can be coded using a number of candidate blend factors (either for the whole frame, or regionally), with each then being evaluated to optimize the image quality (determined, for example, by the highest signal to noise ratio, or SNR) and for lowest bit count. These candidate evaluations can then be used to select the best value for the blend proportion. A combination of both image change characteristics and coded quality/efficiency can also be used.

Of course, B frames near the middle of a sequence, or resulting from low values of M, are not affected very much by proportional interpolation, since the computed proportions are already near the equal average. However, for higher values of M, the extreme B frame positions can be significantly affected by the choice of blend factor. Note that the blend factor can be different for these extreme positions, utilizing more of the average, than the more central positions, which gain little or no benefit from deviating from the average, since they already have high proportions of both neighboring P (or I) frames. For example, if M=5, the first and fourth B frame might use a blend factor F which blends in more of the equal average, but the second and third middle B frames may use the strict $2/5$ and $3/5$ equal average proportions. If the proportion-to-average blend factor varies, it can be conveyed in the compressed bitstream or as side information to the decoder.

If a static general blend factor is required (due to lack of a method to convey the value), then the value of $2/3$ is usually near optimal, and can be selected as a static value for B frame interpolation in both the encoder and decoder. For example, using F=$2/3$ for the blend factor, for M=3 the successive frame proportions will be $7/18$ ($7/18=2/3*1/3+1/3*1/2$) and $11/18$ ($11/18=2/3*2/3+1/3*1/2$).

Linear Interpolation

Luminance values used in compression are non-linear. The use of various forms of non-linear representation include logarithmic, exponential (to various powers), and exponential with a black correction (used commonly for video signals).

Over narrow dynamic ranges, or for interpolations of nearby regions, the non-linear representation is acceptable, since these nearby interpolations represent piece-wise linear interpolations. Thus, small variations in brightness are reasonably approximated by linear interpolation. However, for wide variations in brightness, such as occur in wide dynamic range and wide contrast range images, the treatment of nonlinear signals as linear will be inaccurate. Even for normal contrast range images, linear fades and cross-dissolves can be degraded by a linear interpolation. Some fades and cross-dissolves utilize non-linear fade and dissolve rates, adding further complexity.

Thus, an additional improvement to the use of proportional blends is to perform the interpolation on pixel values represented in a linear space, or in other optimized non-linear spaces differing from the original non-linear luminance representation.

This may be accomplished, for example, by first converting the two non-linear luminance signals (from the previous and subsequent P (or I) frames into a linear representation, or a differing non-linear representation. Then a proportional blend is applied, after which the inverse conversion is applied, yielding the blended result in the image's original non-linear luminance representation. However, the proportion function will have been performed on a more optimal representation of the luminance signals.

It is also possible to beneficially apply this linear or non-linear conversion to color values, in addition to luminance, when colors are fading or becoming more saturated, as occurs in contrast changes associated with variations in haze and overcast.

Example Embodiment

Figure 4:
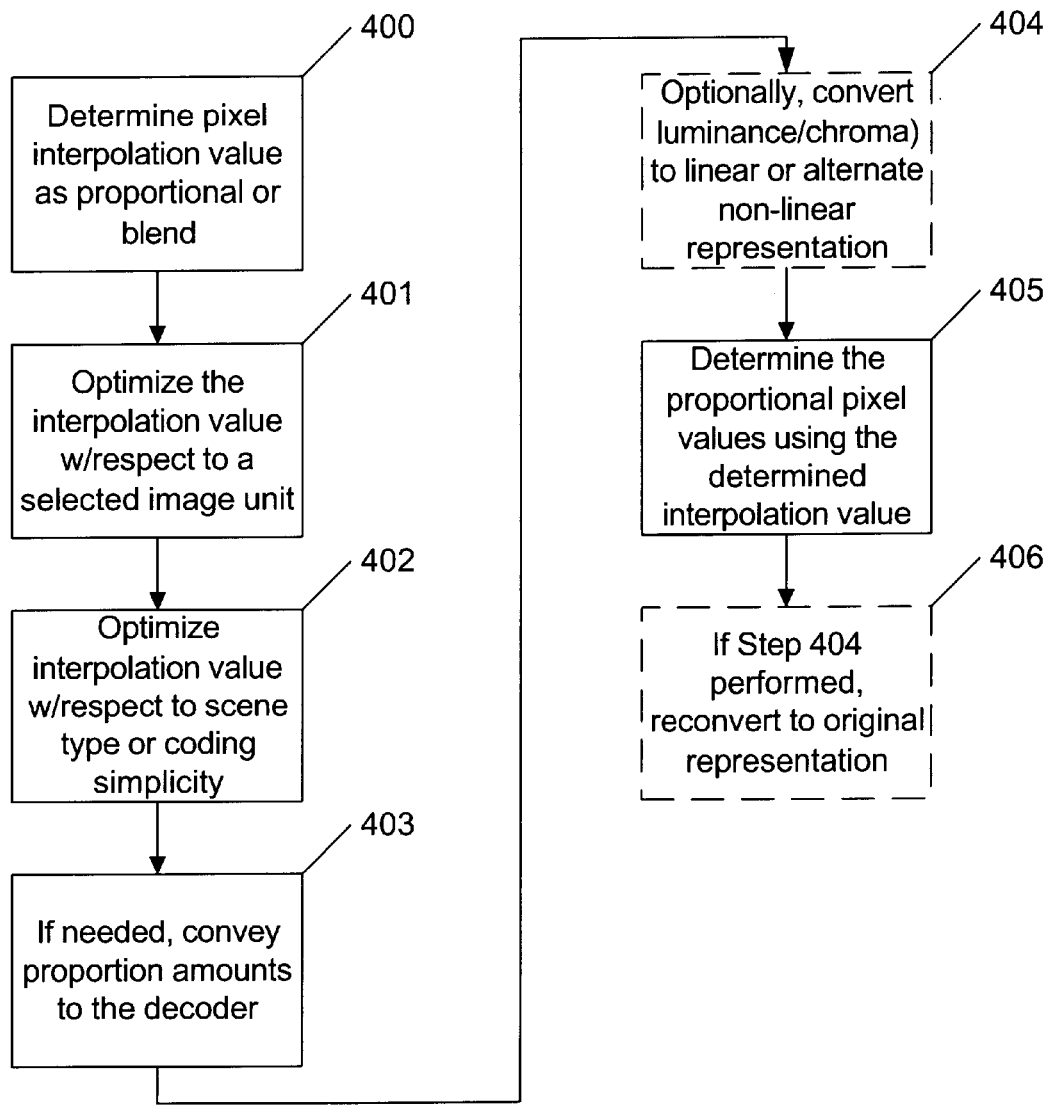
FIG. 4 is a flowchart showing an illustrative embodiment of the invention as a method that may be computer implemented.

FIG. 4 is a flowchart showing an illustrative embodiment of the invention as a method that may be computer implemented:

Step 400: In a video image compression system, for direct and interpolative mode for computing B frames, determine an interpolation value to apply to each pixel of an input sequence of two or more bi-directionally predicted intermediate frames using one of the frame-distance proportion or a blend of equal weighting and the frame-distance proportion derived from at least two non-bidirectionally predicted frames bracketing such sequence input from a source (e.g., a video image stream).

Step 401: Optimize the interpolation value with respect to an image unit, such as a region within a frame or one or more frames. The interpolation value may be set statically for the entire encoding session, or dynamically for each scene, GOP, frame, group of frames, or regionally within a frame.

Step 402: Further optimize the interpolation value with respect to scene type or coding simplicity. For example, an interpolation value may be set statically (such as $2/3$ proportional and $1/3$ equal average); proportionally for frames near the equal average, but blended with equal average near the adjacent P (or I) frames; dynamically based upon overall scene characteristics, such as fades and cross dissolves; dynamically (and locally) based on local image region characteristics, such as local contrast and local dynamic range; or dynamically (and locally) based upon coding performance, such as highest coded SNR, and minimum coded bits generated.

Step 403: Convey the appropriate proportion amounts to the decoder, if not statically determined.

Step 404: Optionally, convert the luminance (and, optionally, chroma) information for each frame to a linear or alternate non-linear representation, and convey this alternate blend representation to the decoder, if not statically determined.

Step 405: Determine the proportional pixel values using the determined interpolation value.

Step 406: If necessary (because of Step 404), reconvert to the original representation.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A method for improving the image quality of a sequence of two or more bi-directionally predicted intermediate frames in a video image compression system, each frame comprising a plurality of pixels, including determining the value of each pixel of each bi-directionally predicted intermediate frame as a weighted proportion of corresponding pixel values in non-bidirectionally predicted frames bracketing the sequence of bi-directionally predicted intermediate frames.

2. The method of claim 1, wherein the weighted proportion is a function of the distance between the bracketing non-bidirectionally predicted frames.

3. The method of claim 1, wherein the weighted proportion is a blended function of the distance between the bracketing non-bidirectionally predicted frames and an equal average of the bracketing non-bidirectionally predicted frames.

4. The method of claim 3, wherein the blended function for each bi-directionally predicted intermediate frame weighted proportion is:

$$\text{weight} = F \cdot (\text{frame distance proportional weight}) + (1-F) \cdot (\text{equal average weight})$$

where F is a selected blend factor ranging from 0 to 1, "frame distance proportional weight" is a function of the distance between the bracketing non-bidirectionally predicted frames, and "equal average weight" is an equal average of the bracketing non-bidirectionally predicted frames.

5. The method of claim 4, further including optimizing the blend factor F for a selected region of at least one frame.

6. The method of claim 4, further including optimizing the blend factor F for a selected range of frames.

7. The method of claim 4, further including optimizing the blend factor F as a function of scene characteristics within at least one frame.

8. The method of claim 4, wherein the blend factor F varies as a function of the position of a bi-directionally predicted intermediate frame with respect to the bracketing non-bidirectionally predicted frames.

9. The method of claim 4, further including:
(a) selecting at least two candidate blend factors F;
(b) applying the candidate blend factors F in determining pixel values for at least one bi-directionally predicted intermediate frame to determine corresponding evaluation sets of frames;
(c) coding each evaluation set of frames;
(d) evaluating each such coded evaluation set of frames with respect to at least one compression characteristic;
(e) selecting one such evaluation set of frames having a desired compression characteristic; and
(f) selecting, as a final blend factor F, the candidate blend factor F corresponding to the selected evaluation set of frames.

10. The method of claim 9, wherein the compression characteristic is the number of bits generated during coding.

11. The method of claim 9, wherein the compression characteristic is a signal to noise ratio measurement.

12. A method for improving the image quality of a sequence of one or more bi-directionally predicted intermediate frames in a video image compression system, each frame comprising a plurality of pixels having luminance and chroma characteristics in a first non-linear representation, including:
(a) converting at least one of the luminance and chroma characteristics of such plurality of pixels to a second representation;
(b) determining the value of each pixel of each bi-directionally predicted intermediate frame in such second representation as a weighted proportion of corresponding pixel values in non-bidirectionally predicted frames bracketing the sequence of bi-directionally predicted intermediate frames; and
(c) converting such plurality of pixels from the second representation back to the first representation.

13. The method of claim 12, wherein the second representation is a linear representation.

14. The method of claim 12, wherein the second representation is a non-linear representation differing from the first non-linear representation.

15. A computer program, stored on a computer-readable medium, for improving the image quality of a sequence of two or more bi-directionally predicted intermediate frames in a video image compression system, each frame comprising a plurality of pixels, the computer program comprising instructions for causing a computer to determine the value of each pixel of each bi-directionally predicted intermediate frame as a weighted proportion of corresponding pixel values in non-bidirectionally predicted frames bracketing the sequence of bi-directionally predicted intermediate frames.

16. The computer program of claim 12, wherein the weighted proportion is a function of the distance between the bracketing non-bidirectionally predicted frames.

17. The computer program of claim 12, wherein the weighted proportion is a blended function of the distance between the bracketing non-bidirectionally predicted frames and an equal average of the bracketing non-bidirectionally predicted frames.

18. The computer program of claim 17, wherein the blended function for each bi-directionally predicted intermediate frame weighted proportion is:

$$\text{weight} = F \cdot (\text{frame distance proportional weight}) + (1-F) \cdot (\text{equal average weight})$$

where F is a selected blend factor ranging from 0 to 1, "frame distance proportional weight" is a function of the distance between the bracketing non-bidirectionally predicted frames, and "equal average weight" is an equal average of the bracketing non-bidirectionally predicted frames.

19. The computer program of claim 18, further including instructions for causing a computer to optimize the blend factor F for a selected region of at least one frame.

20. The computer program of claim 18, further including instructions for causing a computer to optimize the blend factor F for a selected range of frames.

21. The computer program of claim 18, further including instructions for causing a computer to optimize the blend factor F as a function of scene characteristics within at least one frame.

22. The computer program of claim 18, wherein the blend factor F varies as a function of the position of a bi-directionally predicted intermediate frame with respect to the bracketing non-bidirectionally predicted frames.

23. The computer program of claim 18, further including instructions for causing a computer to:
(a) select at least two candidate blend factors F;
(b) apply the candidate blend factors F in determining pixel values for at least one bi-directionally predicted intermediate frame to determine corresponding evaluation sets of frames;
(c) code each evaluation set of frames;
(d) evaluate each such coded evaluation set of frames with respect to at least one compression characteristic;
(e) select one such evaluation set of frames having a desired compression characteristic; and
(f) select, as a final blend factor F, the candidate blend factor F corresponding to the selected evaluation set of frames.

24. The computer program of claim 23, wherein the compression characteristic is the number of bits generated during coding.

25. The computer program of claim 23, wherein the compression characteristic is a signal to noise ratio measurement.

26. A computer program, stored on a computer-readable medium, for improving the image quality of a sequence of one or more bi-directionally predicted intermediate frames in a video image compression system, each frame comprising a plurality of pixels having luminance and chroma characteristics in a first non-linear representation, the computer program comprising instructions for causing a computer to:
(a) convert at least one of the luminance and chroma characteristics of such plurality of pixels to a second representation;
(b) determine the value of each pixel of each bi-directionally predicted intermediate frame in such second representation as a weighted proportion of corresponding pixel values in non-bi-directionally predicted frames bracketing the sequence of bi-directionally predicted intermediate frames; and
(c) convert such plurality of pixels from the second representation back to the first representation.

27. The computer program of claim 12, wherein the second representation is a linear representation.

28. The computer program of claim 12, wherein the second representation is a non-linear representation differing from the first non-linear representation.

29. A system for improving the image quality of a sequence of two or more bi-directionally predicted intermediate frames in a video image compression system, each frame comprising a plurality of pixels, including:
(a) means for inputting at least two non-bidirectionally predicted frames bracketing the sequence of bi-directionally predicted intermediate frames; and
(b) means for determining the value of each pixel of each bi-directionally predicted intermediate frame as a weighted proportion of corresponding pixel values in the non-bidirectionally predicted frames bracketing the sequence of bi-directionally predicted intermediate frames.

30. The system of claim 29, wherein the weighted proportion is a function of the distance between the bracketing non-bidirectionally predicted frames.

31. The system of claim 29, wherein the weighted proportion is a blended function of the distance between the bracketing non-bidirectionally predicted frames and an equal average of the bracketing non-bidirectionally predicted frames.

32. The system of claim 31, wherein the blended function for each bi-directionally predicted intermediate frame weighted proportion is:

$$\text{weight} = F \cdot (\text{frame distance proportional weight}) + (1-F) \cdot (\text{equal average weight})$$

where F is a selected blend factor ranging from 0 to 1, "frame distance proportional weight" is a function of the distance between the bracketing non-bidirectionally predicted frames, and "equal average weight" is an equal average of the bracketing non-bidirectionally predicted frames.

33. The system of claim 32, further including means for optimizing the blend factor F for a selected region of at least one frame.

34. The system of claim 32, further including means for optimizing the blend factor F for a selected range of frames.

35. The system of claim 32, further including means for optimizing the blend factor F as a function of scene characteristics within at least one frame.

36. The system of claim 32, wherein the blend factor F varies as a function of the position of a bi-directionally predicted intermediate frame with respect to the bracketing non-bidirectionally predicted frames.

37. The system of claim 32, further including:
(a) means for selecting at least two candidate blend factors F;
(b) means for applying the candidate blend factors F in determining pixel values for at least one bi-directionally predicted intermediate frame to determine corresponding evaluation sets of frames;
(c) means for coding each evaluation set of frames;
(d) means for evaluating each such coded evaluation set of frames with respect to at least one compression characteristic;
(e) means for selecting one such evaluation set of frames having a desired compression characteristic; and
(f) means for selecting, as a final blend factor F, the candidate blend factor F corresponding to the selected evaluation set of frames.

38. The system of claim 37, wherein the compression characteristic is the number of bits generated during coding.

39. The system of claim 37, wherein the compression characteristic is a signal to noise ratio measurement.

40. A system for improving the image quality of a sequence of one or more bi-directionally predicted intermediate frames in a video image compression system, each frame comprising a plurality of pixels having luminance and chroma characteristics in a first non-linear representation, including:
(a) means for converting at least one of the luminance and chroma characteristics of such plurality of pixels to a second representation;
(b) means for determining the value of each pixel of each bi-directionally predicted intermediate frame in such second representation as a weighted proportion of corresponding pixel values in non-bidirectionally predicted frames bracketing the sequence of bi-directionally predicted intermediate frames; and
(c) means for converting such plurality of pixels from the second representation back to the first representation.

41. The system of claim 40, wherein the second representation is a linear representation.

42. The system of claim 40, wherein the second representation is a non-linear representation differing from the first non-linear representation.

* * * * *